US012458873B2

(12) United States Patent
Lu et al.

(10) Patent No.: US 12,458,873 B2
(45) Date of Patent: Nov. 4, 2025

(54) CONTROL ASSEMBLY

(71) Applicant: DEXIN CORP., New Taipei (TW)

(72) Inventors: Ho Lung Lu, New Taipei (TW); Chin-Lung Lin, New Taipei (TW); Tzu-Hua Tseng, New Taipei (TW)

(73) Assignee: DEXIN CORP., New Taipei (TW)

( * ) Notice: Subject to any disclaimer, the term of this patent is extended or adjusted under 35 U.S.C. 154(b) by 320 days.

(21) Appl. No.: 18/143,816

(22) Filed: May 5, 2023

(65) Prior Publication Data

US 2024/0066392 A1 Feb. 29, 2024

Related U.S. Application Data

(60) Provisional application No. 63/401,975, filed on Aug. 29, 2022.

(30) Foreign Application Priority Data

Dec. 2, 2022 (TW) .................................. 111146351

(51) Int. Cl.
*A63F 13/24* (2014.01)

(52) U.S. Cl.
CPC .................................... *A63F 13/24* (2014.09)

(58) Field of Classification Search
CPC ........... A63F 13/24; A63F 13/92; A63F 13/98
See application file for complete search history.

(56) References Cited

U.S. PATENT DOCUMENTS

| | | | | |
|---|---|---|---|---|
| 12,059,612 | B2 * | 8/2024 | Guerrero | A63F 13/24 |
| 12,263,400 | B2 * | 4/2025 | Lake | A63F 13/92 |
| 2019/0022522 | A1 * | 1/2019 | Croft | G06F 3/0338 |
| 2019/0379231 | A1 * | 12/2019 | Gonzalez | A63F 13/98 |
| 2021/0275907 | A1 * | 9/2021 | Khaira | A63F 13/92 |
| 2021/0283515 | A1 * | 9/2021 | Del Valle | H04M 1/04 |
| 2023/0182011 | A1 * | 6/2023 | Vroom | H04M 1/72409 463/39 |

* cited by examiner

*Primary Examiner* — Peter J Iannuzzi
(74) *Attorney, Agent, or Firm* — Maschoff Brennan

(57) ABSTRACT

A control assembly includes two controllers and a retractable and foldable mechanism, the retractable and foldable mechanism includes two retractable parts and a central part, and the two controllers are respectively movably connected to two opposite ends of the central part via the two retractable parts.

9 Claims, 13 Drawing Sheets

CONTROL ASSEMBLY

CROSS-REFERENCE TO RELATED APPLICATIONS

This application claims the priority benefits of U.S. provisional application Ser. No. 63/401,975, filed on Aug. 29, 2022 and Taiwan (R.O.C) application serial no. 111146351, filed on Dec. 2, 2022. The entirety of each of the above-mentioned patent application is hereby incorporated by reference herein.

TECHNICAL FIELD

The disclosure relates to a control assembly for portable electronic device.

BACKGROUND

In recent years, with the development of science and technology, people can play various games on smartphones. Meanwhile, the smartphone's screen trend is changed from physical keyboard to touch screen, thus smartphone games are mostly designed to be touchscreen-based. Even though there is a virtual controller shown on screen, it is very inconvenient to play because the virtual controller hides some part of the screen and lacks tactile feedback.

To this end, smartphone-based controllers are developed to provide physical buttons for users to run games smoothly. However, the conventional smartphone-based controllers are large in size and unable to fit into small space.

SUMMARY

Accordingly, one aspect of the disclosure is to provide a control assembly capable of folded into a smaller size and therefore is more portable.

One embodiment of the disclosure provides a control assembly including two controllers and a retractable and foldable mechanism, the retractable and foldable mechanism includes two retractable parts and a central part, the two controllers are respectively movably connected to two opposite ends of the central part via the two retractable parts.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Aspects and advantages of the disclosure will become apparent from the following detailed descriptions with the accompanying drawings. The inclusion of such details provides a thorough understanding of the disclosure sufficient to enable one skilled in the art to practice the described embodiments but it is for the purpose of illustration only and should not be understood to limit the disclosure. On the contrary, it is intended to cover alternatives, modifications, and equivalents as can be included within the spirit and scope of the described embodiments as defined by the appended claims. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features.

It is to be understood that the phraseology and terminology used herein are for the purpose of better understanding the descriptions and should not be regarded as limiting. Unless specified or limited otherwise, the terms "mounted," "connected," and variations thereof are used broadly and encompass both direct and indirect mountings and connections. Unless specified or limited otherwise, the phrase "at least one" as used herein may mean that the quantity of the described element or component is one or more than one but does not necessarily mean that the quantity is only one. The term "and/or" may be used herein to indicate that either or both of two stated possibilities.

Figure 1:
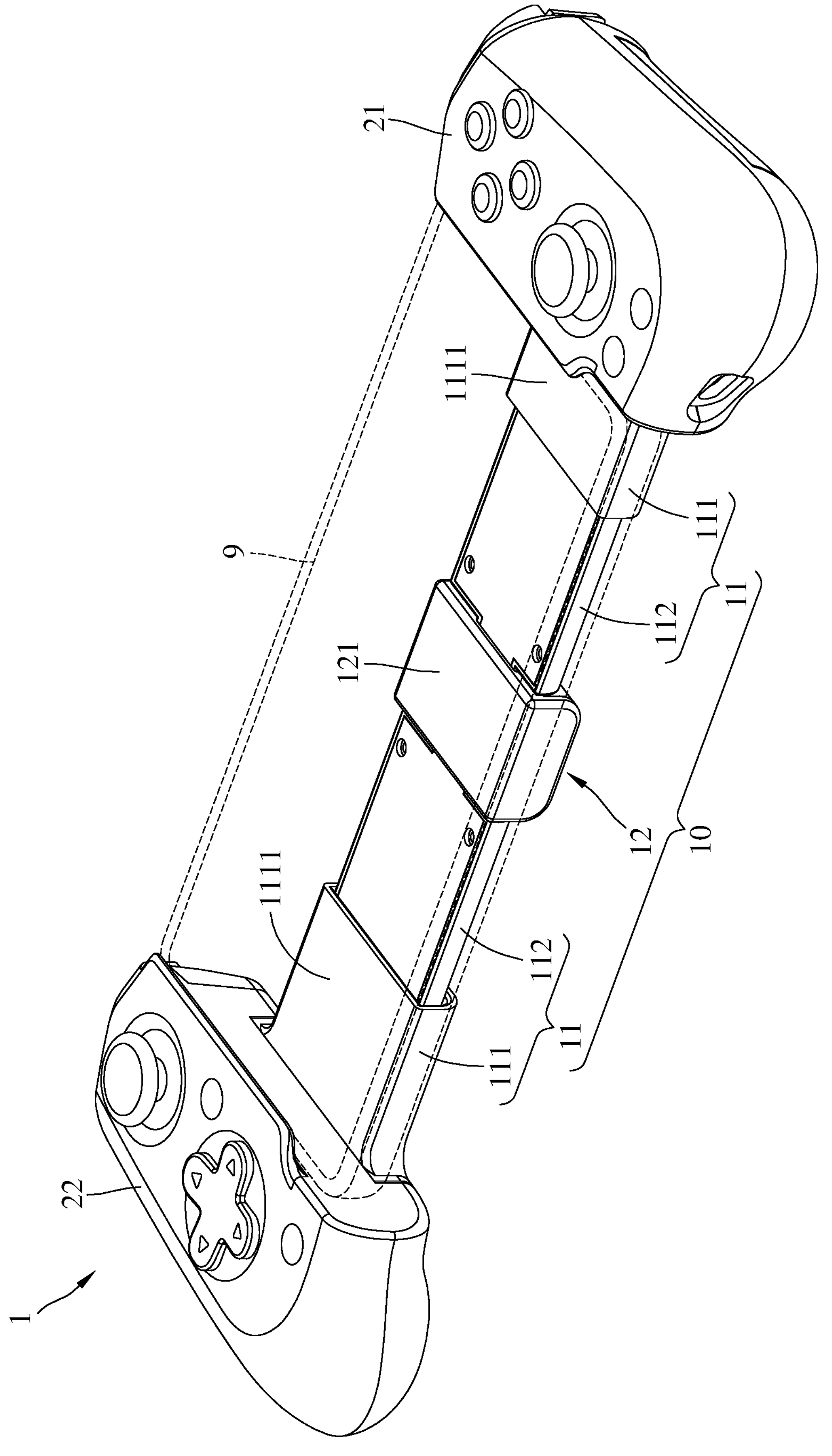
FIG. 1 is a perspective view of a control assembly according to one embodiment of the disclosure when the control assembly is in an extended status and an electronic device is applied thereon.

Firstly, referring to FIG. 1, one embodiment of the disclosure provides a control assembly 1 configured to be installed on a portable electronic device 9 (also called "electronic device" hereinafter). The electronic device 9 may be any typical smartphone or tablet and is not intended to limit the disclosure. The control assembly 1 may be in communication with the electronic device 9 via a wired or wireless manner and therefore becomes an approach for user to control the electronic device 9.

The control assembly 1 may include a retractable and foldable mechanism 10 and controllers 21 and 22. The retractable and foldable mechanism 10 means the part of the control assembly 1 that is configured to be connected between the controllers 21 and 22 and to support the electronic device 9. As shown, the retractable and foldable mechanism 10 may have at least two first supporting surfaces 1111 and a second supporting surface 121 for supporting the electronic device 9. Optionally, when the retractable and foldable mechanism 10 is in an extended status or a retracted status, the first supporting surfaces 1111 and the second supporting surface 121 may be coplanar with each other so as to support the electronic device 9 together. The controllers 21 and 22 may be any suitable means configured for user to hold in hands to operate the electronic device 9.

Figure 7:
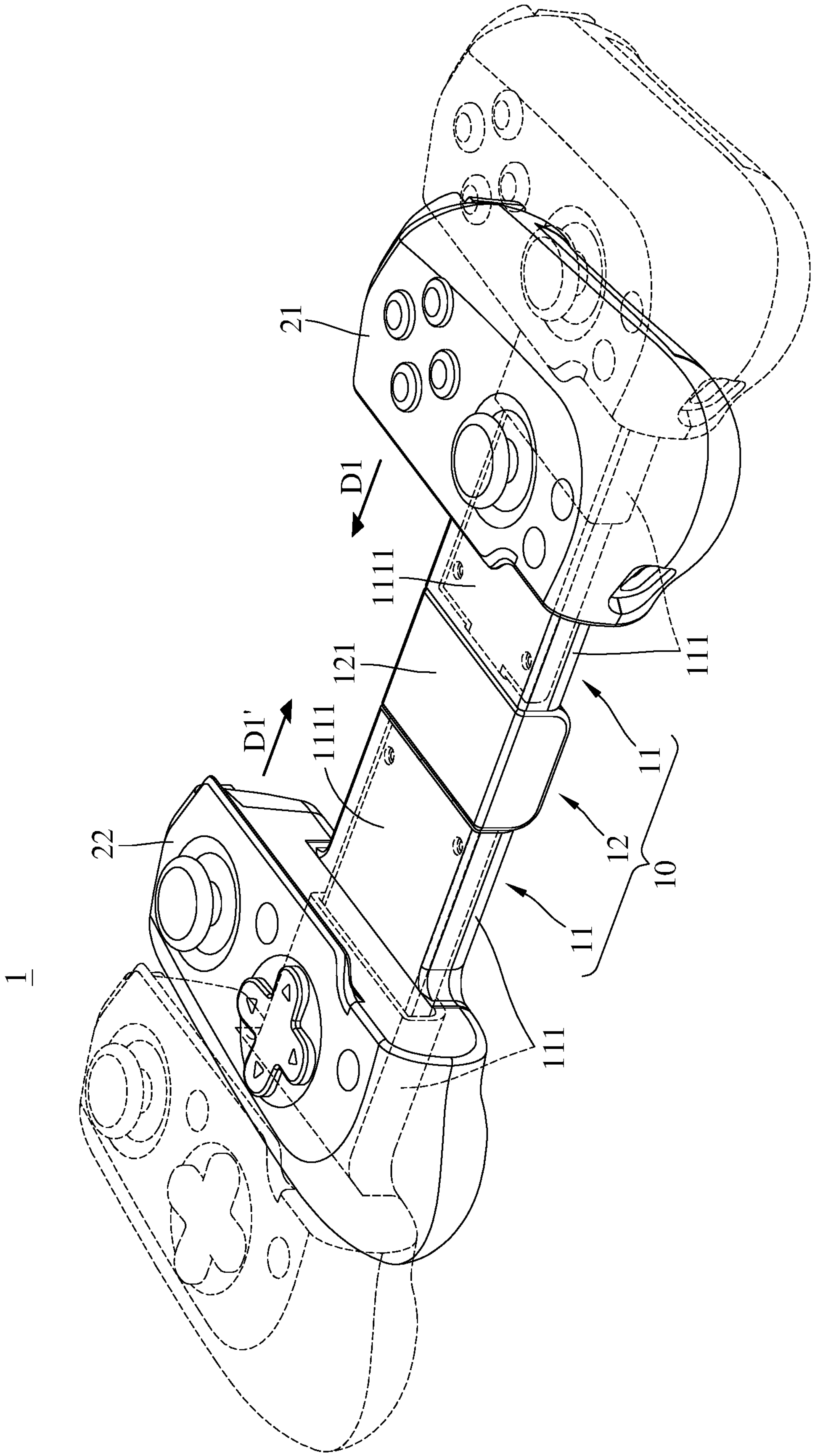
FIG. 7 depicts a perspective view showing the control assembly switched to a retracted status from the extended status.
Figure 8:
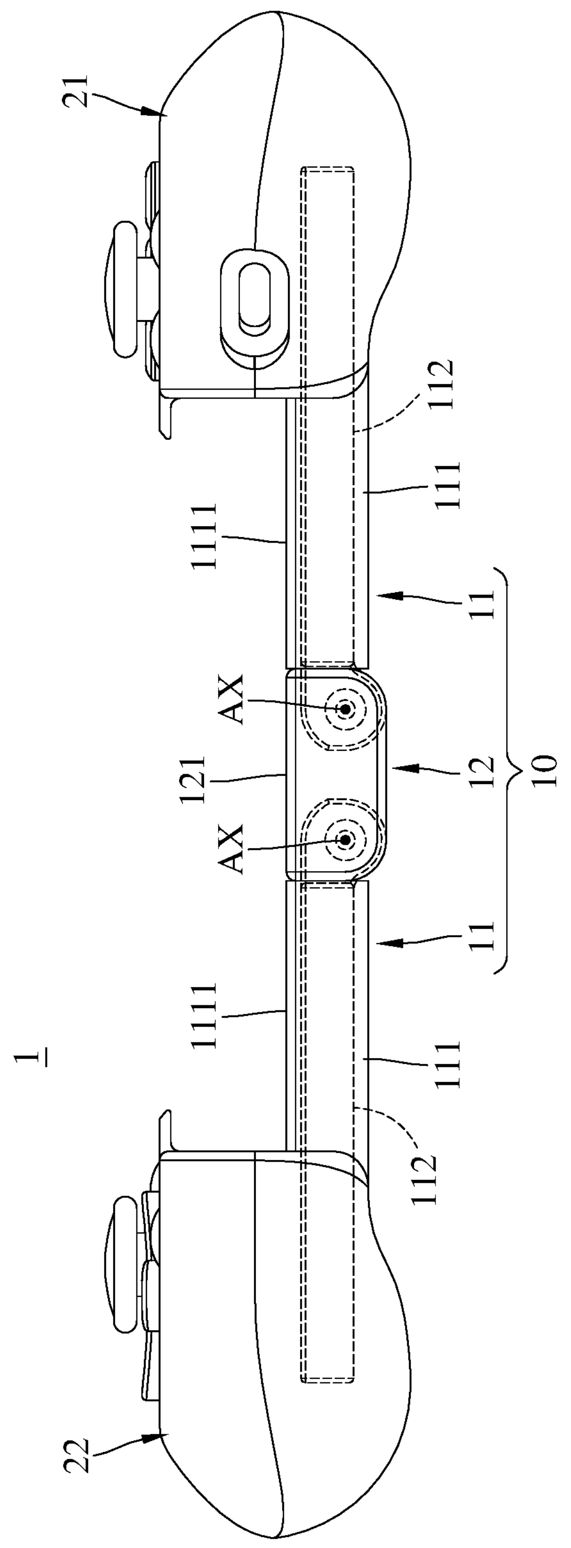
FIG. 8 is a side view of the control assembly according to one embodiment of the disclosure when the control assembly is in the retracted status.

The status of the retractable and foldable mechanism 10 is selectively switched. For example, please see FIGS. 1-3, the retractable and foldable mechanism 10 may be in an extended status, in this status, the retractable and foldable mechanism 10 is able to support the electronic device 9 and the controllers 21 and 22 may be moved outwards to a position suitable for them to clamp the electronic device 9. For example, please see FIGS. 6-8, the retractable and foldable mechanism 10 may be switched to a retracted status from the extended status, in this status, the retractable and foldable mechanism 10 allows the controllers 21 and 22 to be located relatively close to each other so as to reduce the overall size of the control assembly 1 (e.g., shorten the length of the control assembly 1).

In this embodiment, the retractable and foldable mechanism 10 may include two retractable parts 11 and a central part 12. The retractable part 11 means the part of the retractable and foldable mechanism 10 that is configured to be connected between the central part 12 and the controllers 21 and 22. The retractable parts 11 are provided for the user to selectively change or adjust the distance between the controllers 21 and 22. The central part 12 means the part of the retractable and foldable mechanism 10 that is configured to be connected between the retractable parts 11 and also configured to allow the angle adjustment of the controllers 21 and 22. The central part 12 has the second supporting surface 121, thus, the central part 12 is able to support the electronic device 9.

The retractable parts 11 may be similar or the same in configuration, thus only one of the retractable parts 11 will be described in detail below. In this embodiment, the retractable parts 11 may each have a first member 111 and a second member 112. The first member 111 means the part of the retractable part 11 that is configured to be fixed to one of the controllers (21 or 22). The first member 111 has the first supporting surface 1111, thus, the first members 111 are able to support the electronic device 9. Optionally, the first members 111 may be respectively integrally formed with the controllers 21 and 22; in other words, the first members 111 may be parts of the controllers 21 and 22. In some other embodiments, the first members may be fixed to the controllers via screws, structural engagement, or adhesive.

The second member 112 means the part of the retractable part 11 that is configured to be connected between the central part 12 and one of the first members 111. In this embodiment, the second member 112 is slidably disposed through one of the first members 111, and one end of the second member 112 may be pivotally connected to a side of the central part 12. In other words, the first members 111 may be respectively sleeved on the second members 112 and may be respectively movably connected to different sides of the central part 12 via the second members 112. Specifically, the first members 111 may be respectively slidably sleeved on the second members 112 and may be respectively pivotally connected to two opposite sides of the central part 12 via the second members 112.

Figure 2:
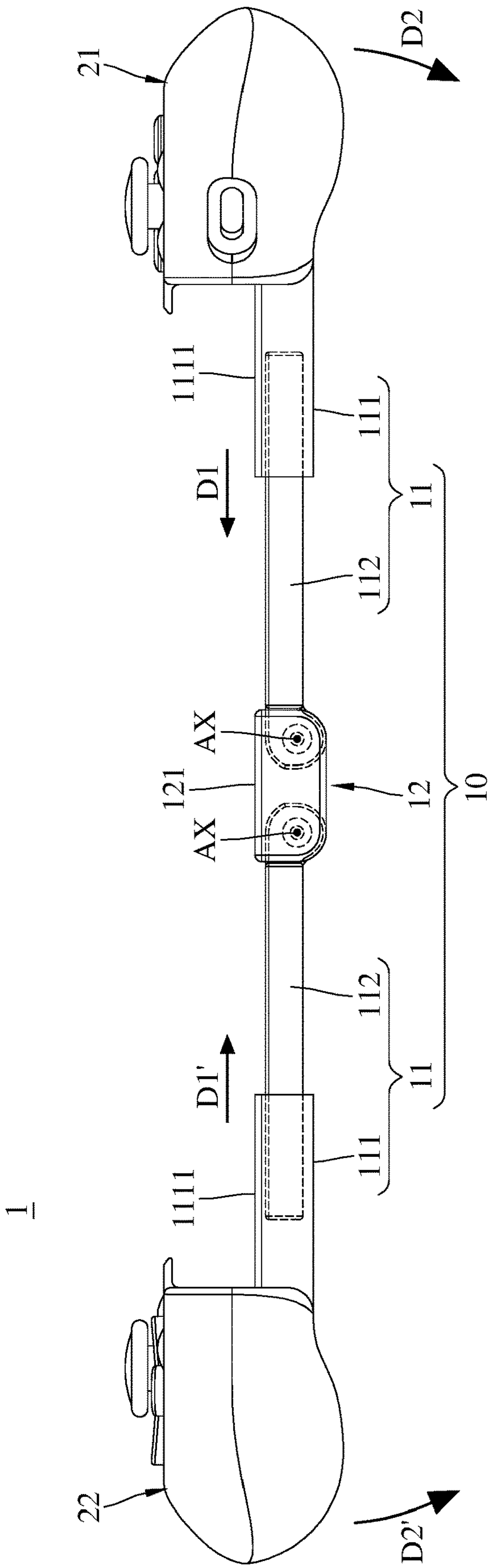
FIG. 2 is a side view of the control assembly in FIG. 1.

As such, the distance between the controllers 21 and 22 is adjustable by moving the first members 111 relative to the second members 112 (as the direction D1 or D1' shown in FIG. 2). Meanwhile, the angles of the controllers 21 and 22 are adjustable by pivoting the second members 112 relative to the central part 12. As shown, the controllers 21 and 22 and the retractable parts 11 are pivotable relative to the central part 12 about a first axis AX1 (as the direction D2 or D2' shown in FIG. 2).

Figure 3:
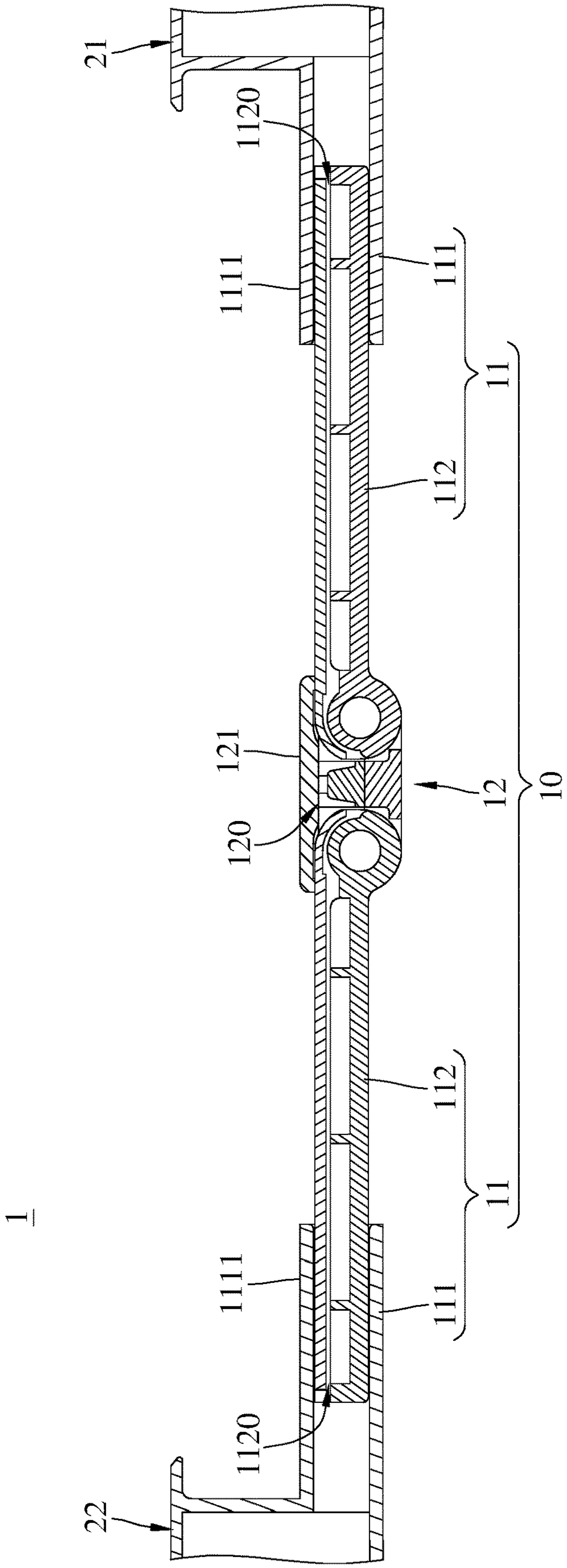
FIG. 3 is a partially-enlarged cross-sectional view of the control assembly in FIG. 1.
Figure 4:
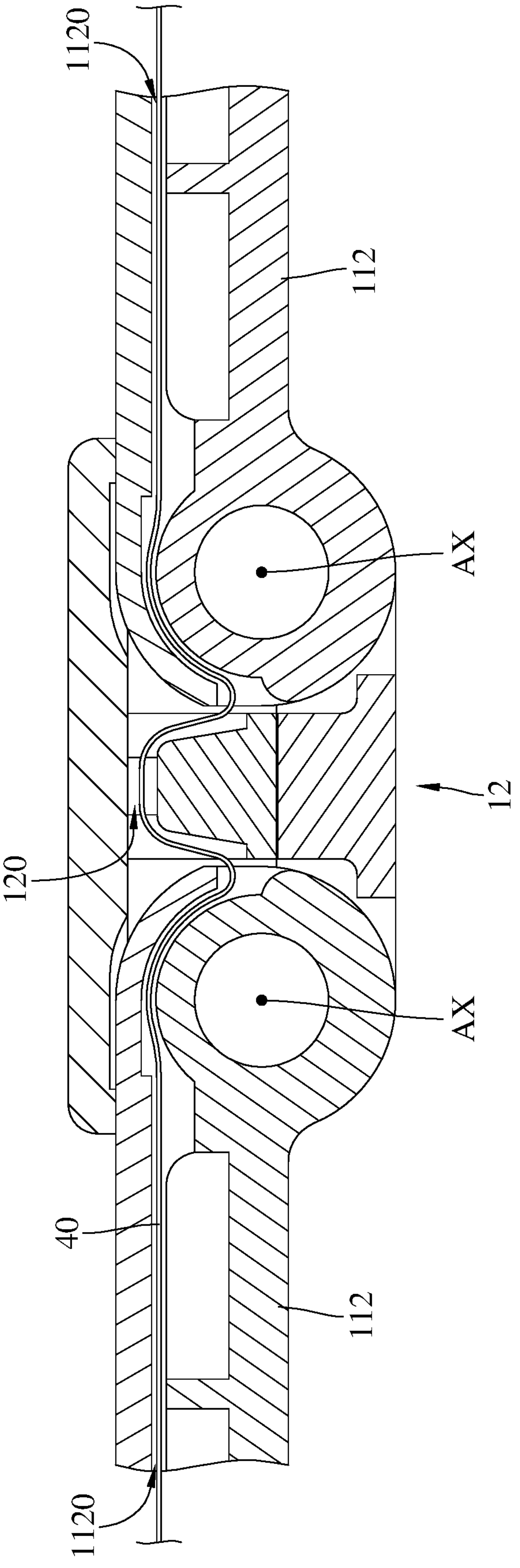
FIG. 4 is a partially-enlarged of FIG. 3.
Figure 9:
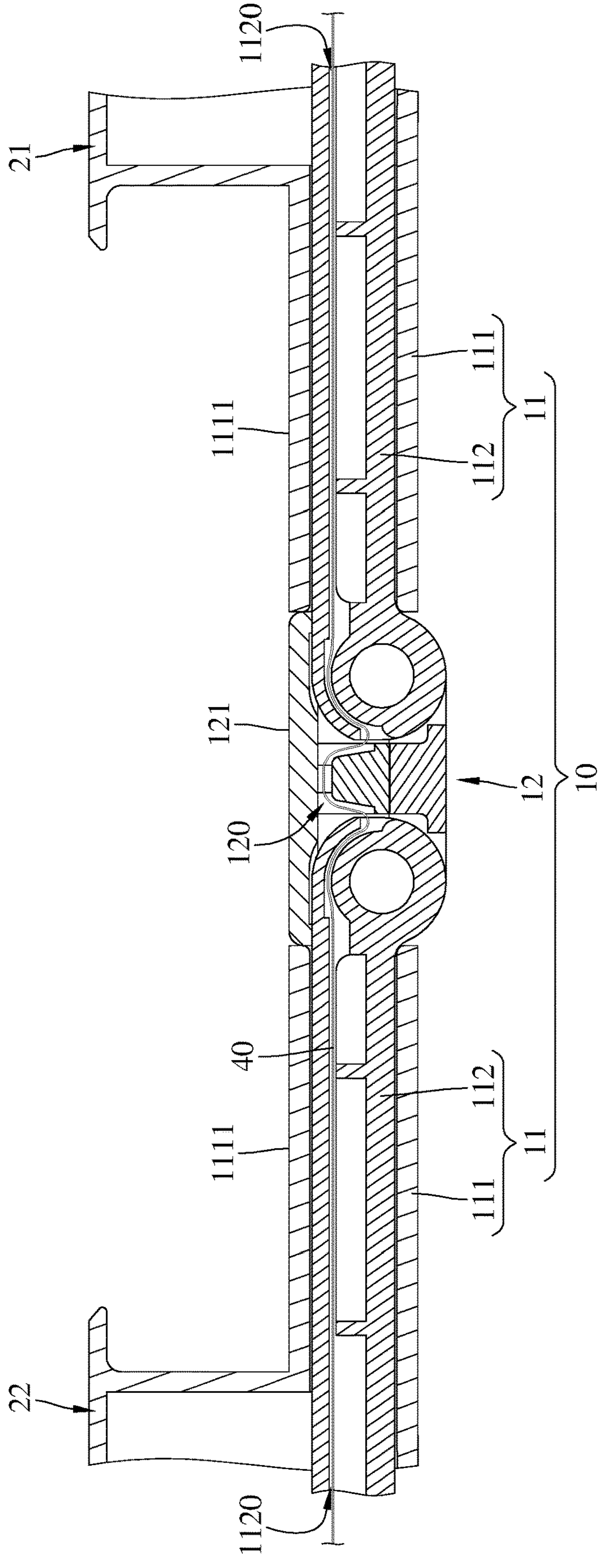
FIG. 9 is a partially-enlarged cross-sectional view of the control assembly in FIG. 8.

Signal/electricity transmission between the controllers 21 and 22 may be achieved by wired manner. For example, as shown in FIGS. 3-4 and 9, in this embodiment, the control assembly 1 may further include a flat cable 40 configured to be electrically connected between the controllers 21 and 22. Corresponding to the flat cable 40, the second member 112 may include a first cable channel 1120, and the central part 12 may include a second cable channel 120. To clearly see the first cable channel 1120 and the second cable channel 120, the flat cable 40 is omitted from FIG. 3.

The flat cable 40 may be any suitable cable capable of enabling the electrical/signal connection between the controllers 21 and 22. The first cable channel 1120 extends from one end of the second member 112 to the other end of the second member 112. The second cable channel 120 extends from one end of the central part 12 to the other end of the central part 12. Two opposite ends of the second cable channel 120 respectively connects to the first cable channels 1120 of the second members 112. Two opposite ends of the first cable channel 1120 connects to the second cable channel 120 of the central part 12 and an internal space of one of the controllers (21 or 22). As such, the first cable channels 1120 and the second cable channel 120 together define a passage between the retractable and foldable mechanism 10 and the controllers 21 and 22 for the flat cable 40 to pass through.

As shown in FIG. 4 or FIG. 9, the part of the flat cable 40 that extends out of the controllers 21 and 22 is disposed through the first cable channels 1120 of the second members 112 and is partially accommodated in the second cable channel 120 of the central part 12. Such an arrangement for the flat cable 40 still allow the retractable part 11, the central part 12, and the controllers 21 and 22 to move relative to each other as required. Also, the flat cable 40 is completely covered by the controllers 21 and 22, the retractable part 11, and the central part 12 (in other words, the flat cable 40 is completely hidden in the controllers 21 and 22 and the retractable and foldable mechanism 10) during the movements among the retractable part 11, the central part 12, and the controllers 21 and 22.

Figure 5:
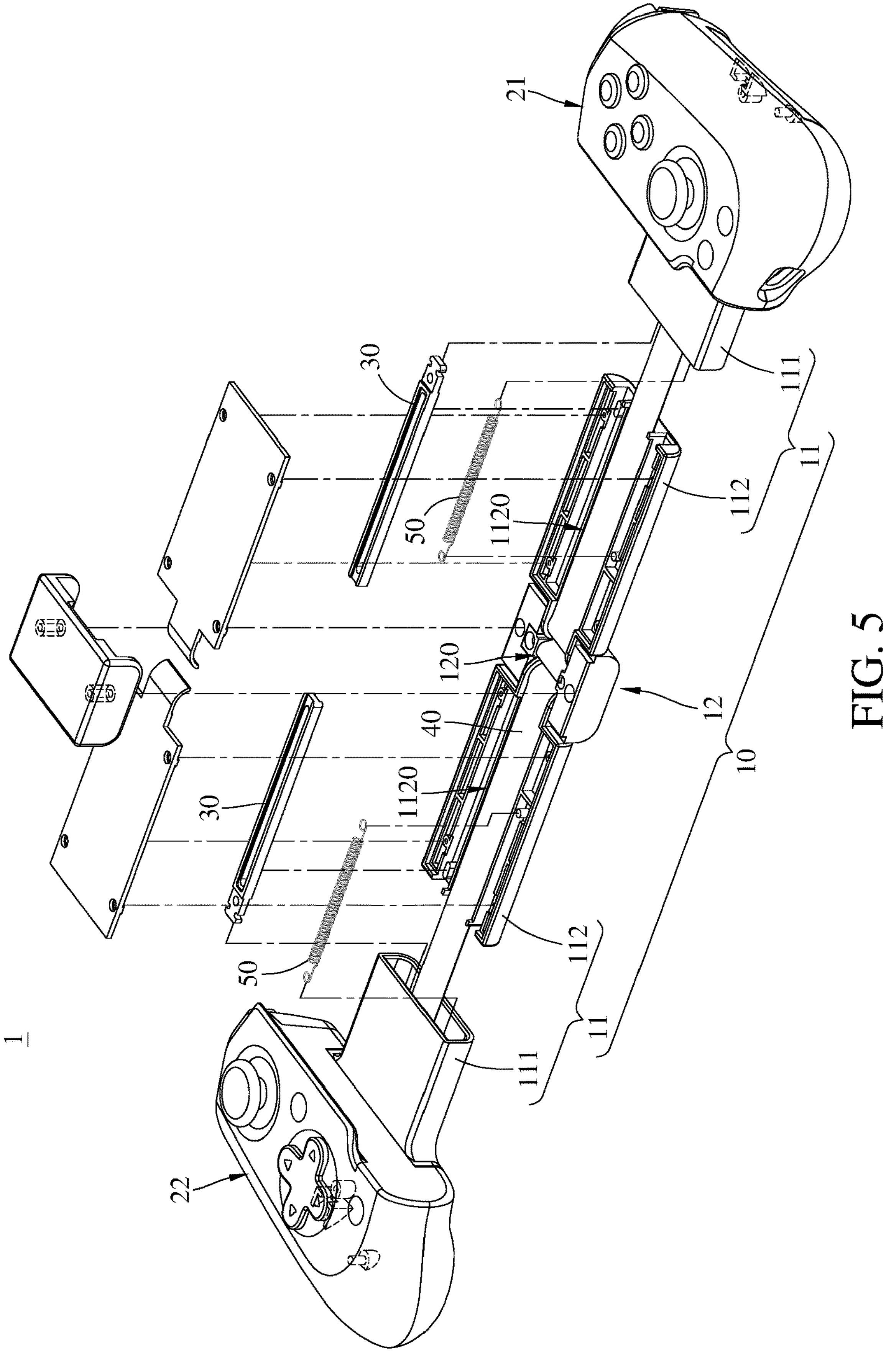
FIG. 5 is an exploded view of the control assembly in FIG. 1.
Figure 6:
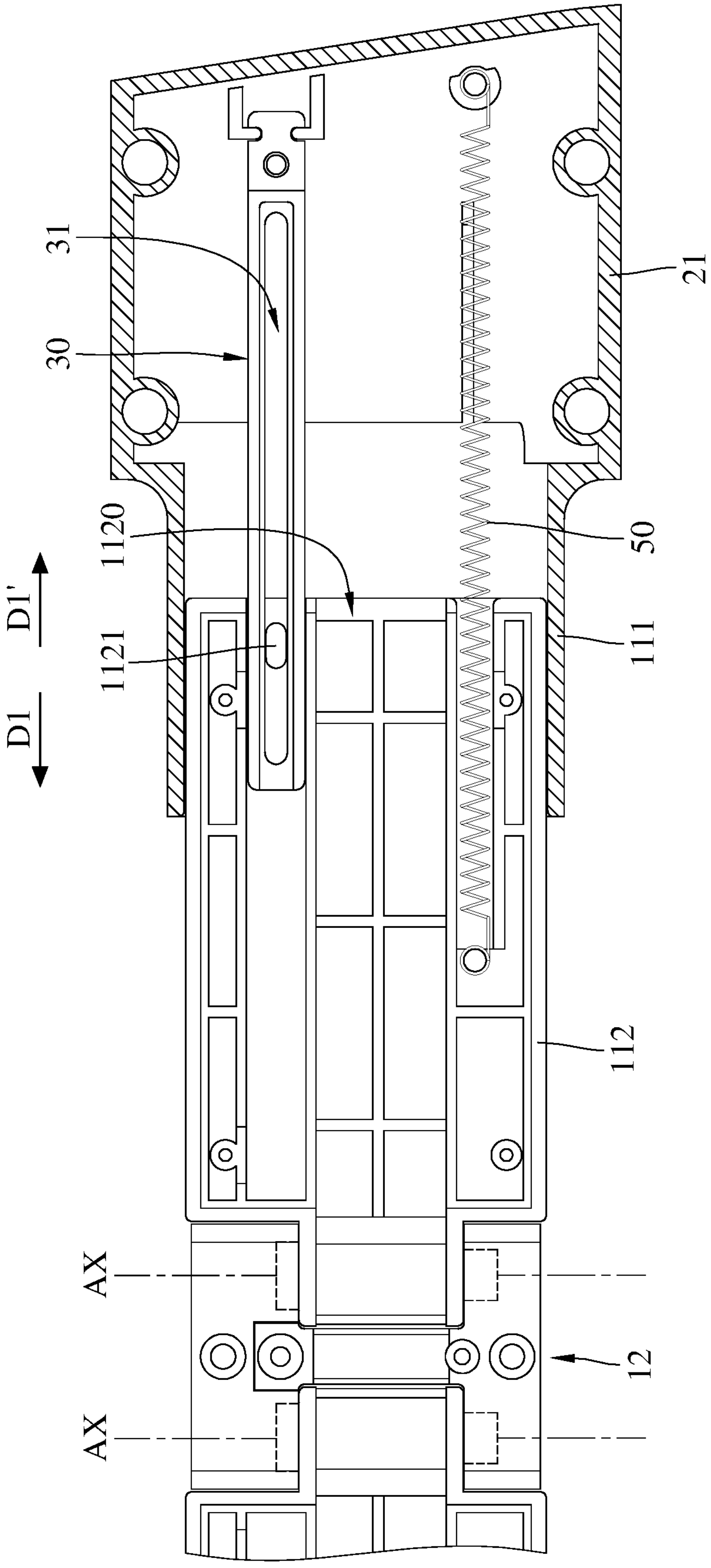
FIG. 6 is another partially-enlarged cross-sectional view of the control assembly in FIG. 1.
Figure 10:
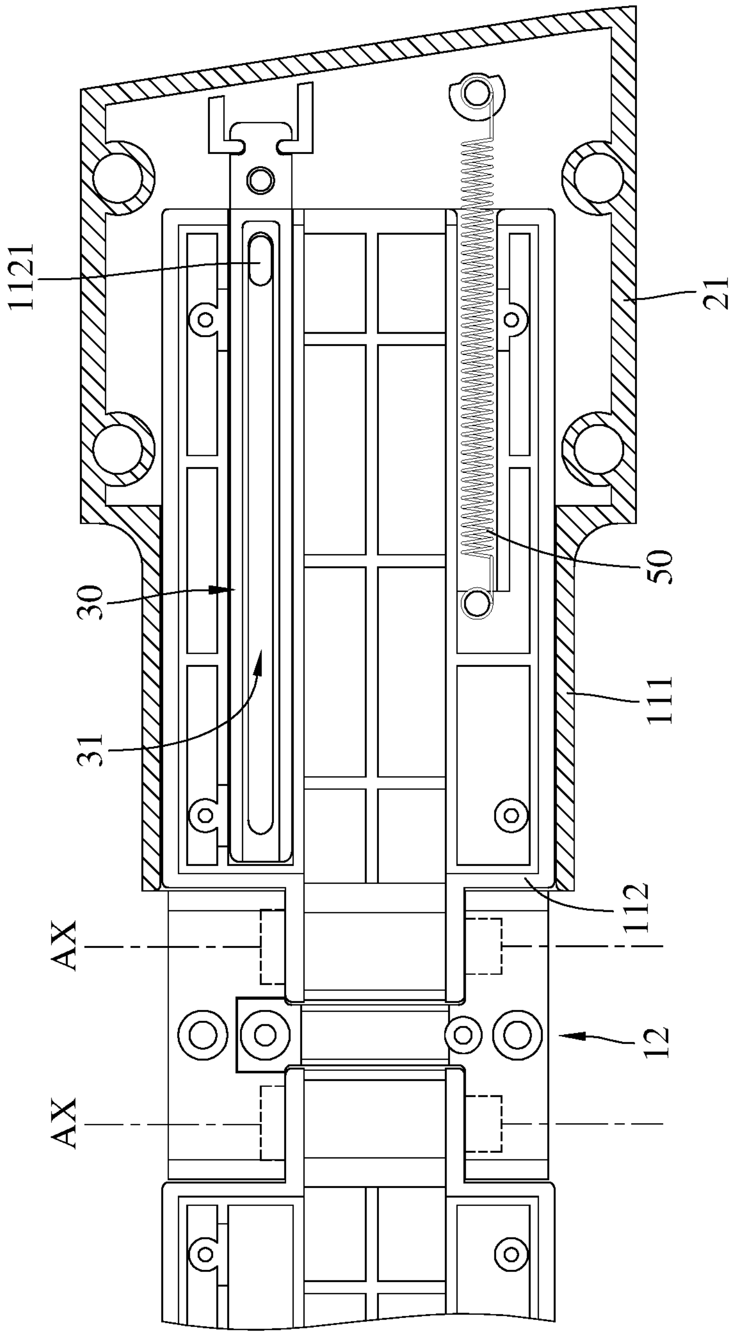
FIG. 10 is another partially-enlarged cross-sectional view of the control assembly in FIG. 8.

Optionally, as shown in FIGS. 5-6 and 10, the retractable and foldable mechanism 10 may include two rail members 30, one end of the rail member 30 may be fixed to one of the controllers (21 or 22), and the other end of the rail member 30 may be slidably connected to the second member 112 of the retractable part 11. In this embodiment, the rail member 30 may have a groove 31, the second member 112 may have a positioning post 1121, and the positioning post 1121 is slidably disposed through the groove 31. The cooperation of the groove 31 and the positioning post 1121 limits the slidable range of the rail member 30 so as to define the slidable range of the second member 112 relative to one of the controllers (21 or 22).

Optionally, please see FIGS. 5-6 and 10, in this embodiment, the retractable and foldable mechanism 10 may include two elastic members 50, one end of the elastic member 50 is fixed to one of the controllers (21 or 22), and the other end of the elastic member 50 is fixed to the second member 112 of the retractable part 11. The elastic member 50 may be any suitable extension spring and therefore the elastic member 50 is able to pull the second member 112 of the retractable part 11 into the first member 111.

As shown in FIGS. 1-3 and 6, the retractable and foldable mechanism 10 can be switched to the extended status. By doing so, the controllers 21 and 22 are moved away from each other to make the control assembly 1 fit the length of the electronic device 9, such that the electronic device is allowed to be placed on the retractable and foldable mechanism 10 and clamped by the controllers 21 and 22. While the controllers 21 and 22 are moving outwards, the elastic members 50 between the retractable part 11 and the controllers 21 and 22 are extended so as to cause the controllers 21 and 22 to clamp the electronic device 9 tighter and thereby improving the stability of the electronic device 9 on the control assembly 1. The groove 31 of the rail member 30 is able to limit the movable range of the positioning post 1121 of the second member 112 so as to prevent the second member 112 from falling off from the first member 111.

As shown in FIGS. 7-10, when it is attempted to install a shorter electronic device or remove the electronic device, the retractable part 11 pulls the controllers 21 and 22 to come closer to each other so that the retractable and foldable mechanism 10 is switched to the retracted status. For example, when the electronic device 9 is removed from the control assembly 1, the elastic members 50 can automatically pull the second member 112 into the first member 111. As shown, the retractable part 11 can be shortened to a status that makes the second member 112 almost entirely accommodated in the first member 111. The groove 31 of the rail member 30 is able to limit the movable range of the positioning post 1121 of the second member 112 so as to prevent the first member 111 from being overly stored into the controller (21 or 22).

Figure 11:
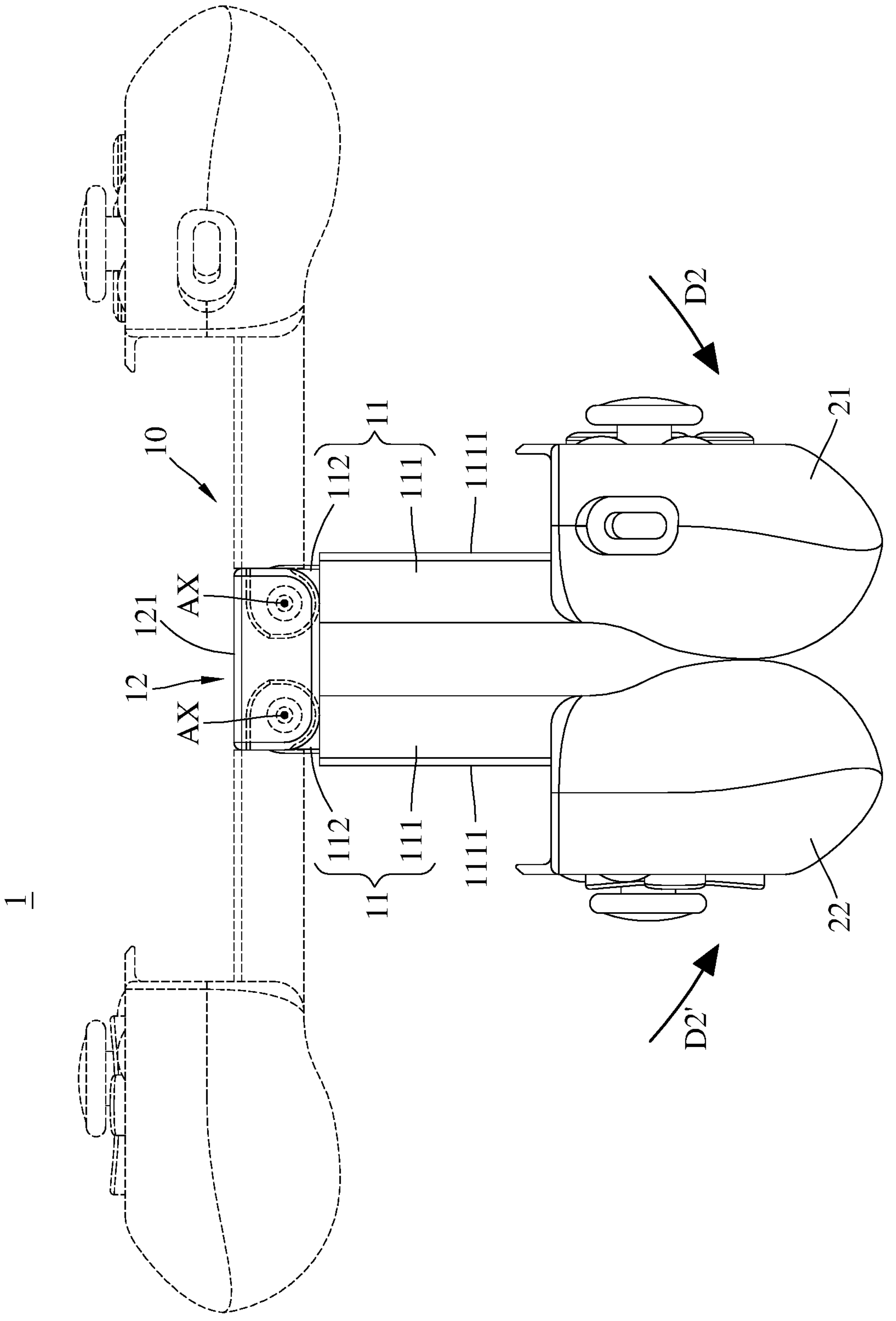
FIG. 11-12 depict how the control assembly is switched to a folded status.
Figure 12:
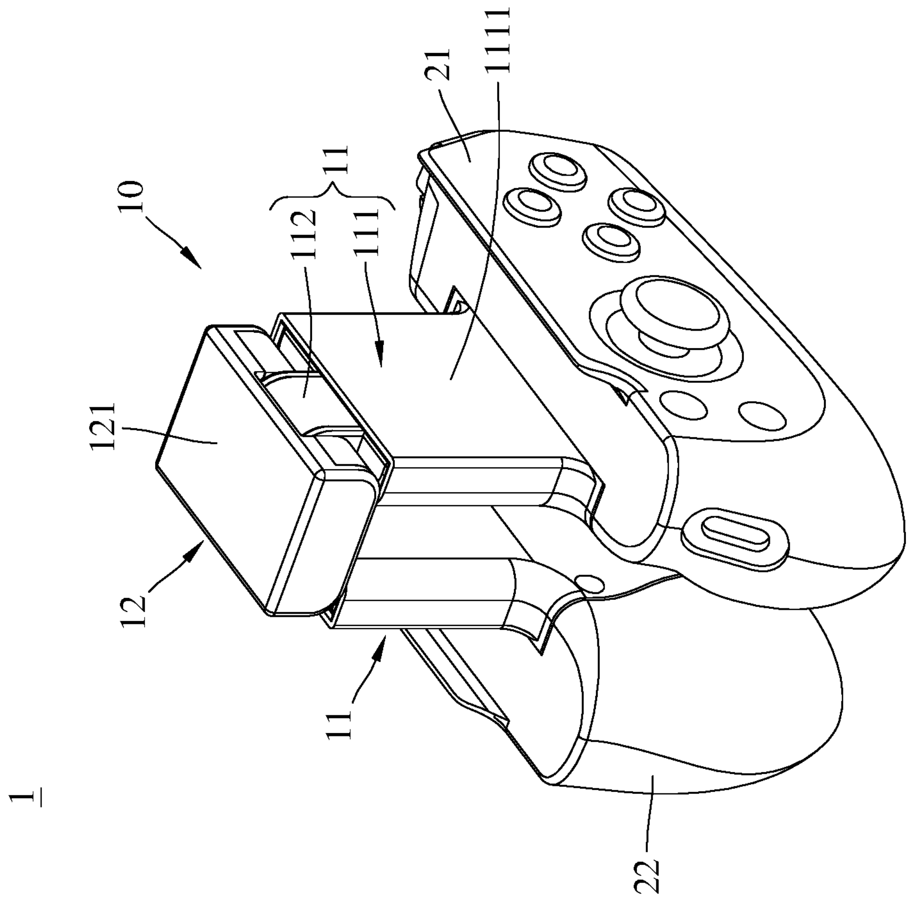
Figure 13:
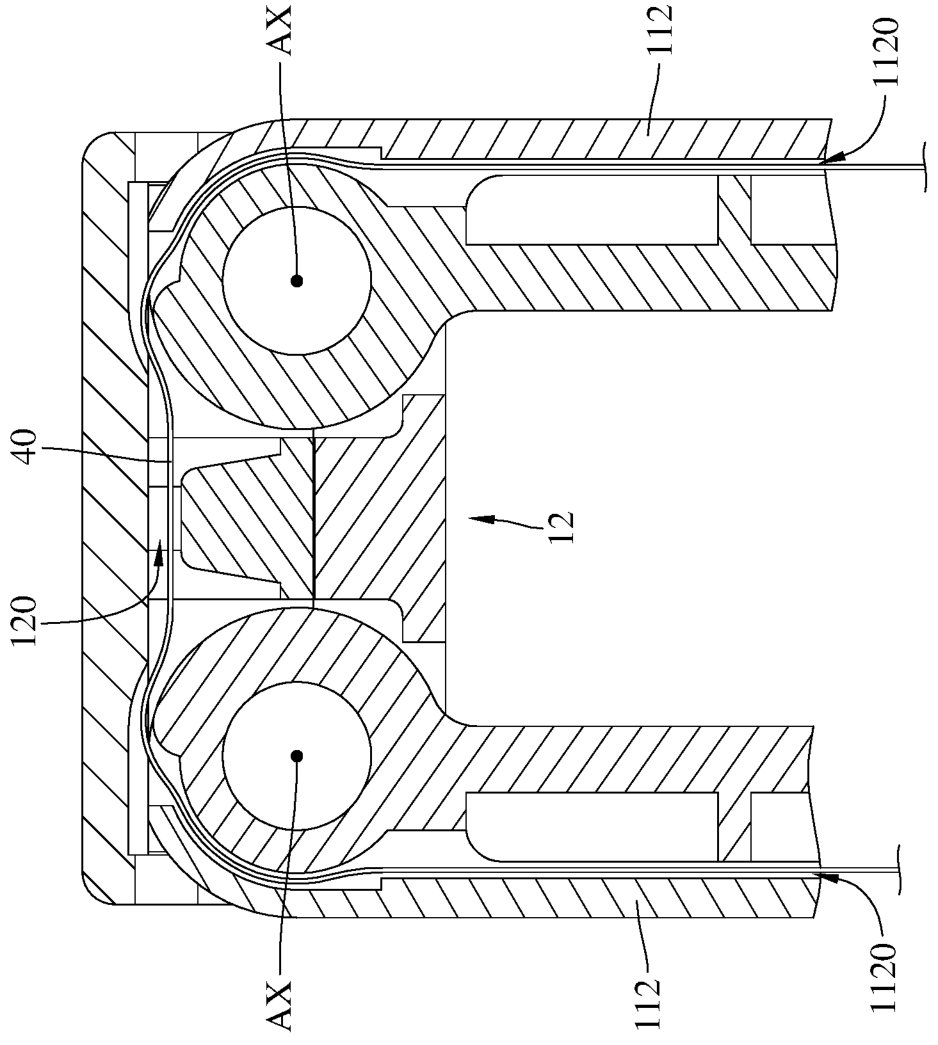
FIG. 13 is a partially-enlarged cross-sectional view of the control assembly in FIG. 12.

Further, please see FIGS. 11-13, the retractable and foldable mechanism 10 can be folded to be in a folded status. After the retractable and foldable mechanism 10 reaches the retracted status, the retractable part 11 can be pivoted relative to the central part 12 about the axis AX and the controllers 21 and 22 can be moved to the same side of the central part 12. By doing so, the controllers 21 and 22 may be arranged side by side and located at the same side of the central part 12. When the retractable and foldable mechanism 10 is in the folded status, the first supporting surface 1111 on the first member 111 may be substantially perpendicular to the second supporting surface 121 on the central part 12. When the retractable and foldable mechanism 10 is in the folded status, the overall size of the control assembly 1 is significantly reduced and therefore is more portable and can fit into small space. Herein, please see FIGS. 4, 9, and 13, the flat cable 40 is completely hidden in the controllers 21 and 22 and the retractable and foldable mechanism 10 during the status switching of the retractable and foldable mechanism 10, which prevents the flat cable 40 from affecting the appearance of the control assembly 1 and also prevents the flat cable 40 from being affected by external particles and moisture. In addition, as shown, the flat cable 40 may spare a certain length hidden in the controllers 21 and 22 for the movements of the retractable and foldable mechanism 10.

According to the control assemblies as discussed in the above embodiments of the disclosure, the controllers are movably connected to two opposite ends of the central part via the retractable parts, thus the distance between the controllers is adjustable to adopt lengths of different electronic devices, and the control assembly is able to be transformed into a smaller and more portable size by adjusting the positions and angle of the controllers and the retractable parts relative to the central part.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A control assembly, comprising:

two controllers; and a retractable and foldable mechanism comprising two retractable parts and a central part, wherein the two controllers are respectively movably connected to two opposite ends of the central part via the two retractable parts;

wherein the two retractable parts each comprises a first member and a second member, the first member is slidably sleeved on the second member, the first member is movably connected to the central part via the second member, and the second members are respectively connected to the two controllers via the first members.

2. The control assembly according to claim 1, wherein the second members are respectively pivotally connected to two opposite sides of the central part.

3. The control assembly according to claim 1, wherein the second members of the two retractable parts each has a first cable channel, the central part has a second cable channel, two opposite ends of the second cable channel are respectively connected to the first cable channels of the second members.

4. The control assembly according to claim 3, further comprising a flat cable disposed through the first cable channels of the second members and the second cable channel of the central part and electrically connected between the two controllers.

5. The control assembly according to claim 4, wherein the flat cable is completely covered by the two controllers, the two retractable parts, and the central part.

6. The control assembly according to claim 1, further comprising two rail members respectively disposed at the two controllers, wherein the two rail members each has a groove, the second members of the two retractable parts each has a positioning post, the positioning posts of the second members are respectively slidably disposed through the grooves of the two rail members.

7. The control assembly according to claim 1, further comprising two elastic members, wherein two opposite ends of each of the two elastic member are respectively fixed to one of the two controllers and one of the second members of the retractable part.

8. The control assembly according to claim 1, wherein when the retractable and foldable mechanism is in an extended status, a first supporting surface of each of the first members and a second supporting surface of the central part are coplanar with each other.

9. A control assembly, comprising:

two controllers; and a retractable and foldable mechanism comprising two retractable parts and a central part, wherein the two controllers are respectively movably connected to two opposite ends of the central part via the two retractable parts;

wherein the retractable and foldable mechanism has a folded status, when the retractable and foldable mechanism is in the folded status, the two controllers are arranged at a same side of the central part respectively via the two retractable parts.

* * * * *